May 21, 1968     H. W. RAYMOND     3,384,065

APPARATUS FOR BRICK CLEANING

Filed Jan. 17, 1966     5 Sheets-Sheet 1

INVENTOR.
HILBERT W. RAYMOND
BY
Ely Silverman
ATTORNEY

May 21, 1968  H. W. RAYMOND  3,384,065
APPARATUS FOR BRICK CLEANING
Filed Jan. 17, 1966  5 Sheets-Sheet 2
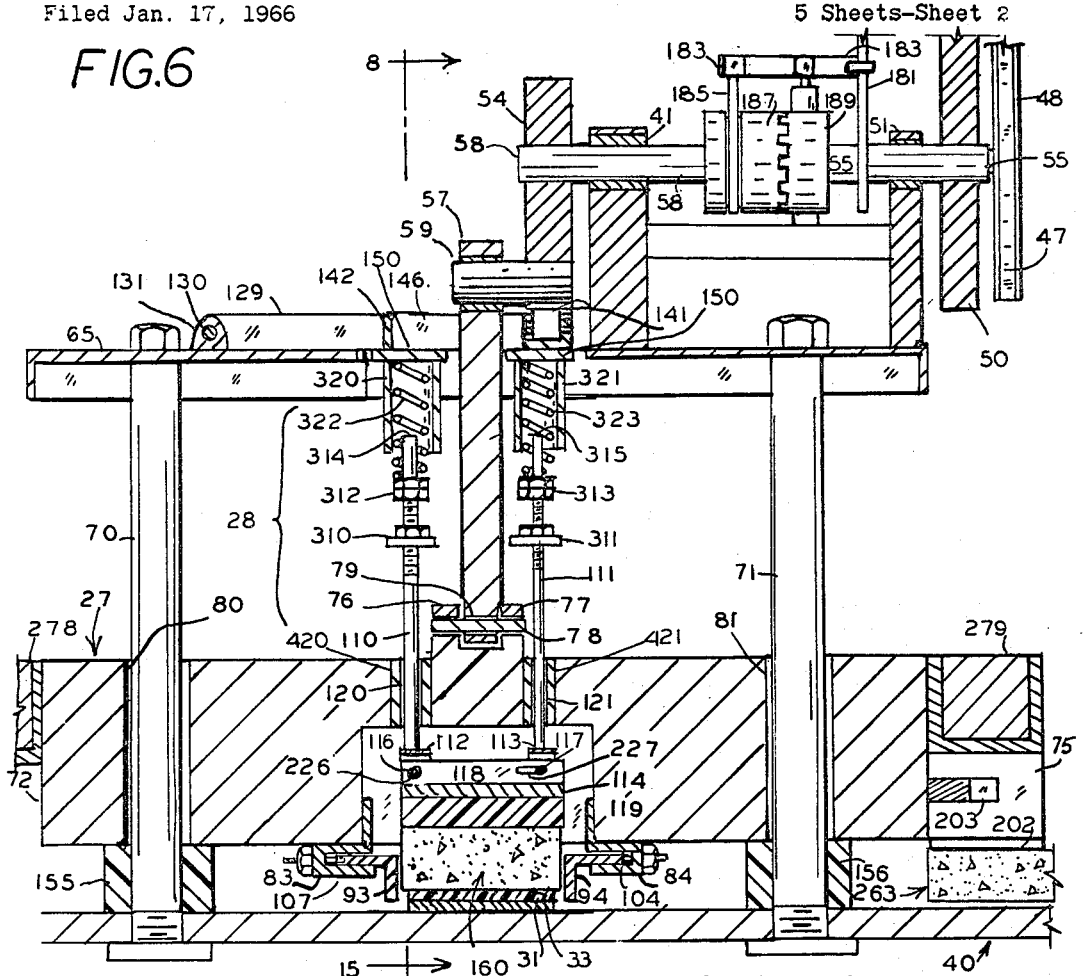
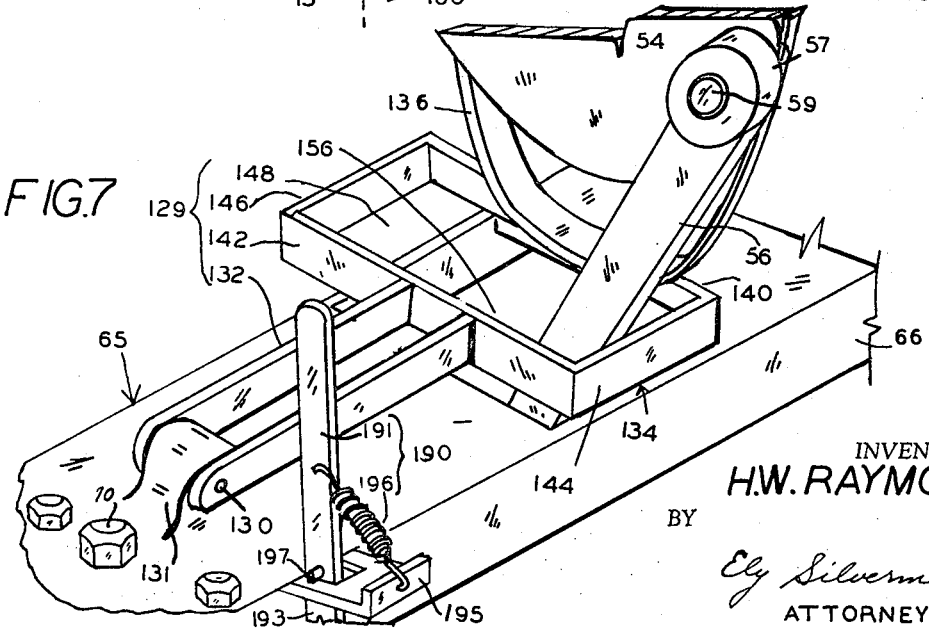
INVENTOR.
H.W. RAYMOND
BY
Ely Silverman
ATTORNEY

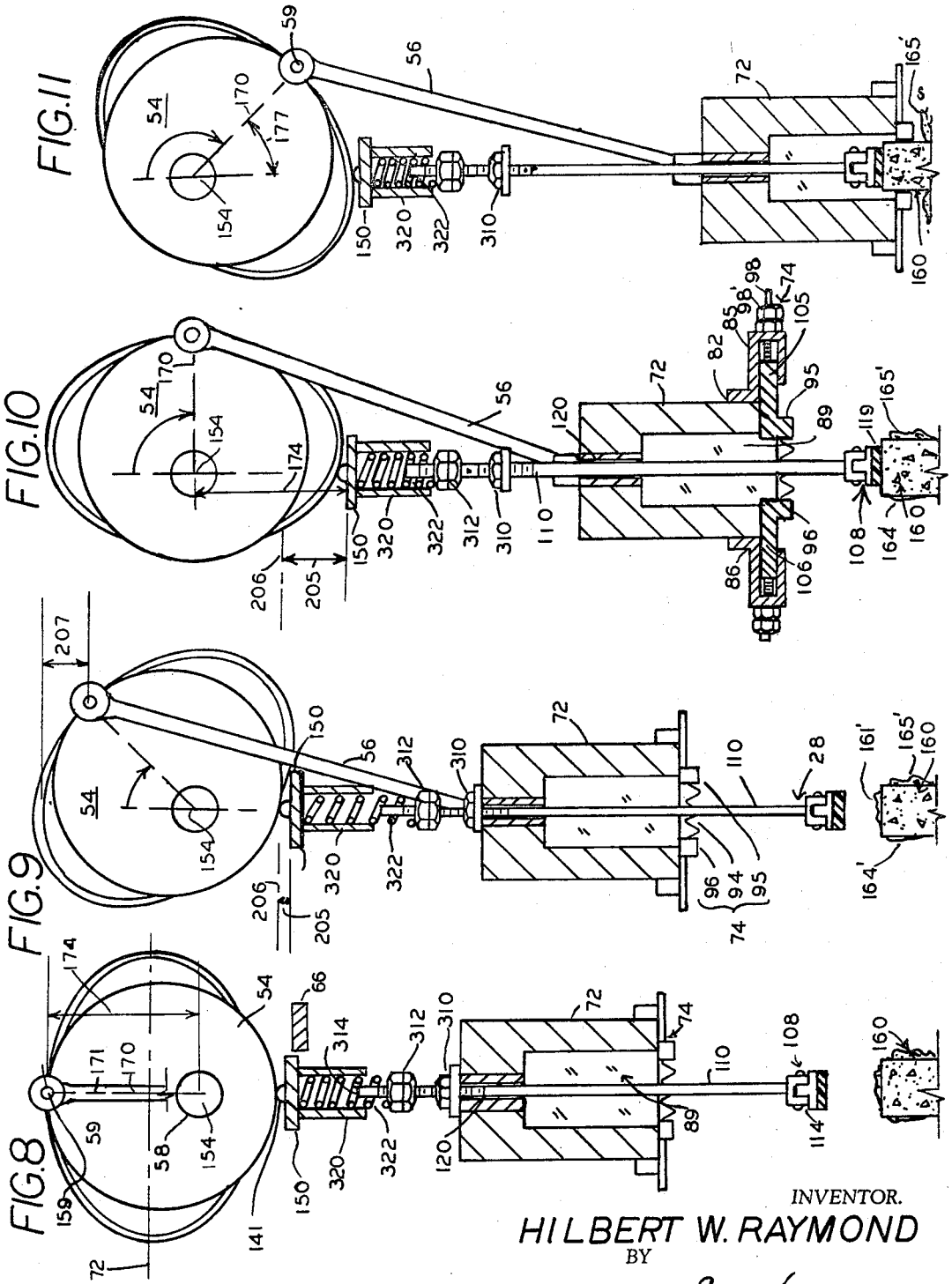

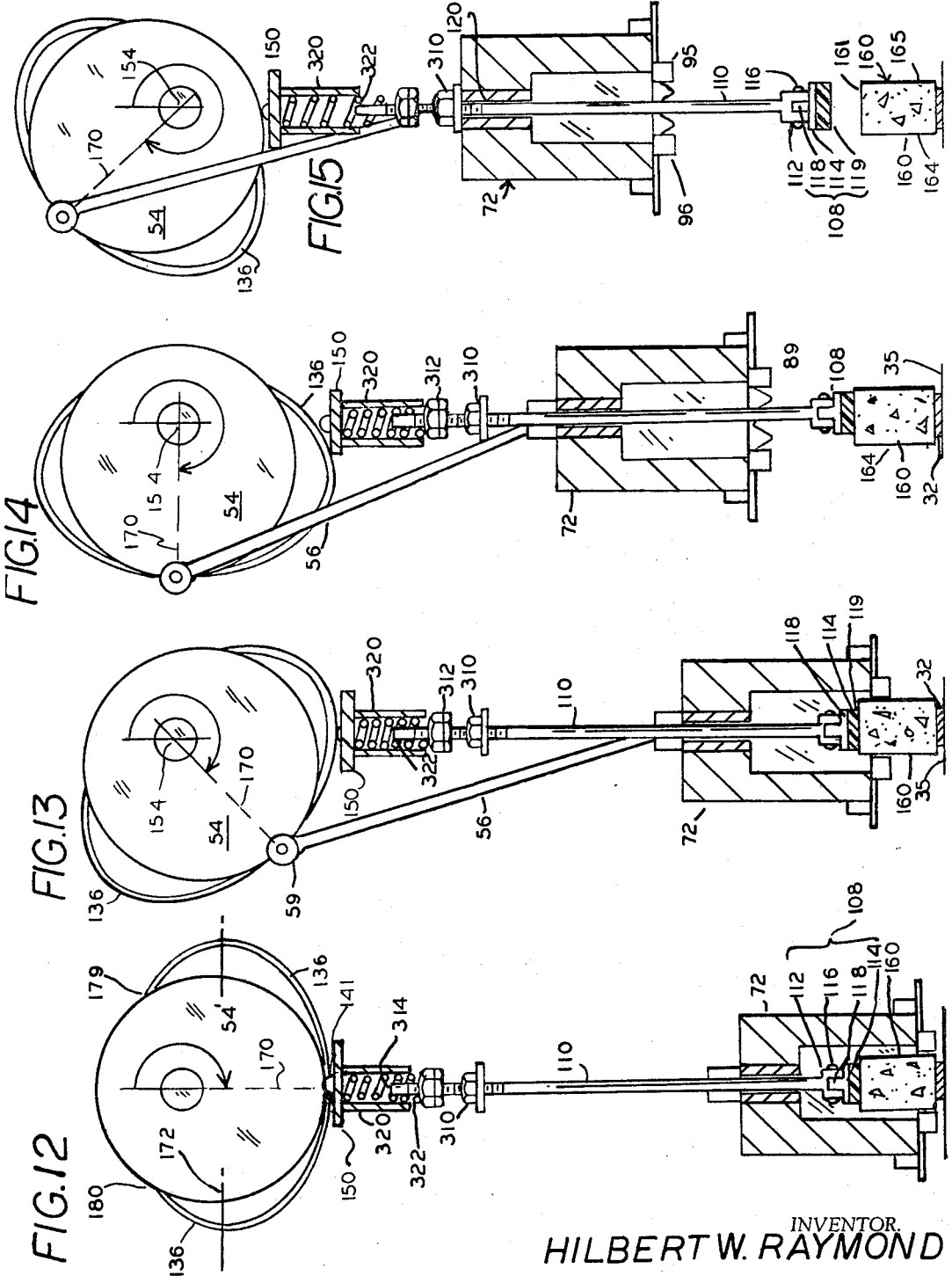

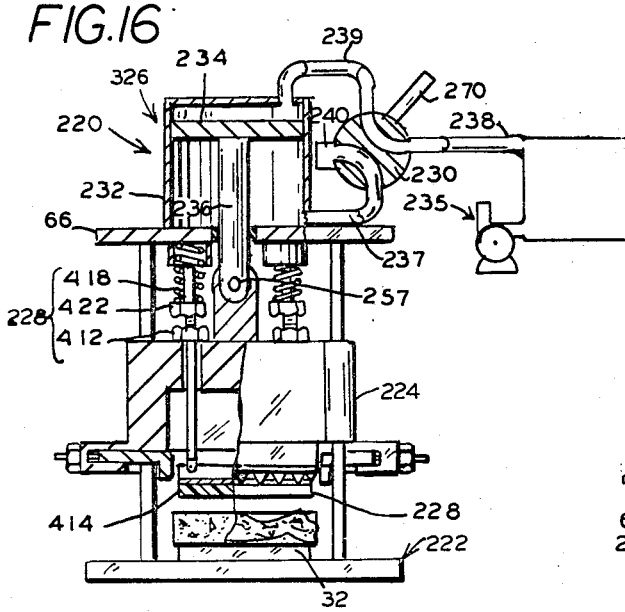
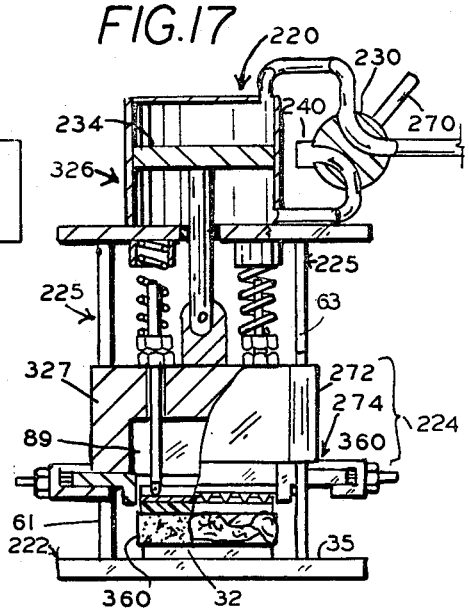
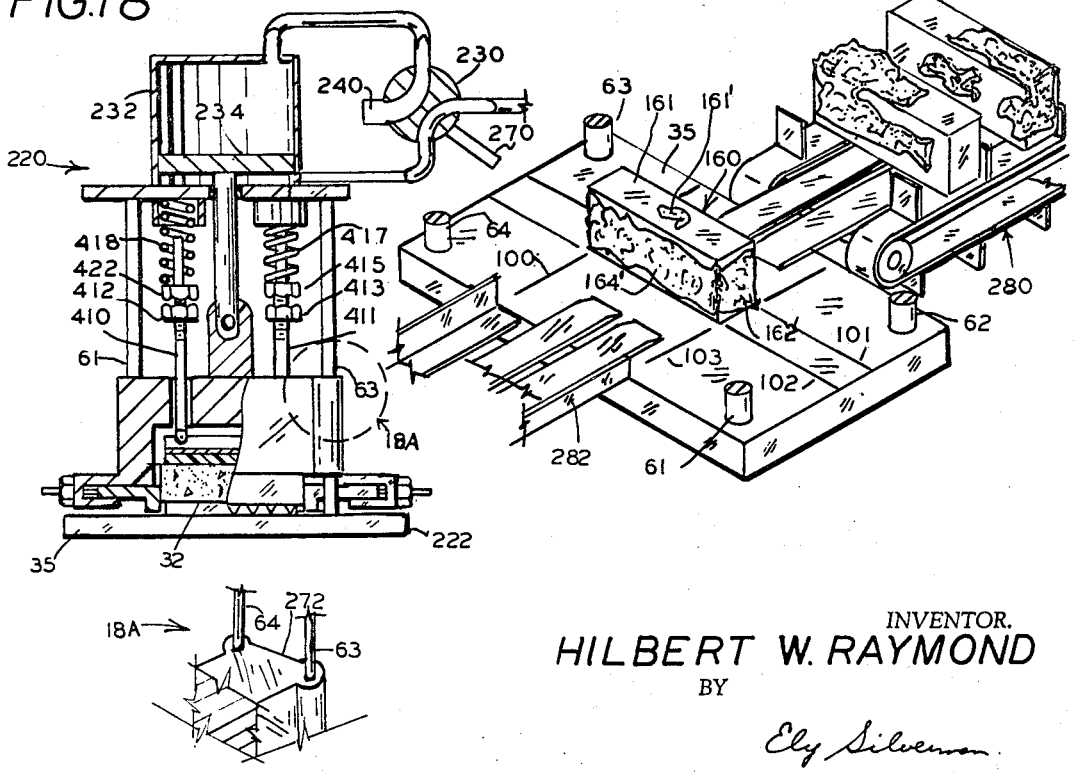

United States Patent Office 3,384,065
Patented May 21, 1968

3,384,065
APPARATUS FOR BRICK CLEANING
Hilbert W. Raymond, Amarillo, Tex., assignor of ten percent to Jim Campbell, twenty percent to Herbert C. Martin, and seventy percent to Herbert C. Martin, as trustee, all of Amarillo, Tex.
Filed Jan. 17, 1966, Ser. No. 521,098
4 Claims. (Cl. 125—26)

This invention relates to an apparatus for cleaning used bricks.

In demolishing old buildings large quantities of used are frequently produced. These are presently cleaned by hand for resale to remove mortar or other bonding material by means of which the bricks had previously been attached to each other. While numerous attempts have been made to produce a machine which would expedite the cleaning of the bricks especially in view of present difficulties in obtaining workers who adequately and carefully clean such by hand, these machines have been unable to satisfactorily produce a clean brick, five faces of which are cleaned, and do so rapidly and with an economically minimum amount of breakage.

It is, therefore, one object of this invention to provide an apparatus for reliably and effectively cleaning large volumes of used bricks in a minimum amount of time in an economical and predictable manner.

Another object of this invention is to produce brick cleaning apparatuses which thoroughly and effectively clean large volumes of used brick in a minimum amount of time in a reliable and predictable manner and wherein up to four sides of the brick, as needed, will be concurrently cleaned of attached mortar or cement.

Another object of this invention is to provide apparatuses as above described which are readily adjustable for accommodating different sizes of bricks or blocks and serve to separate each of the used bricks in a group or mass thereof from each other as well as to clean such used brick individually.

Figure 1:
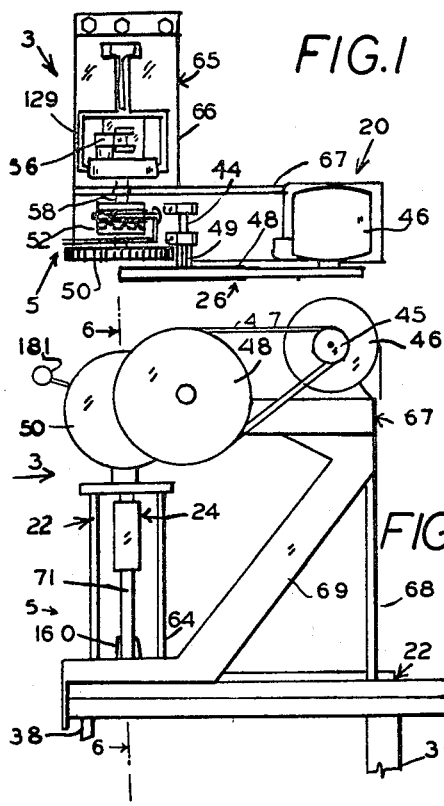
Figure 2:
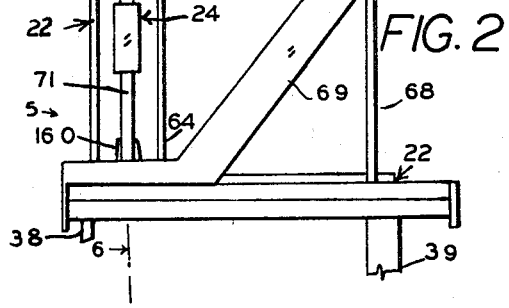
Figure 3:
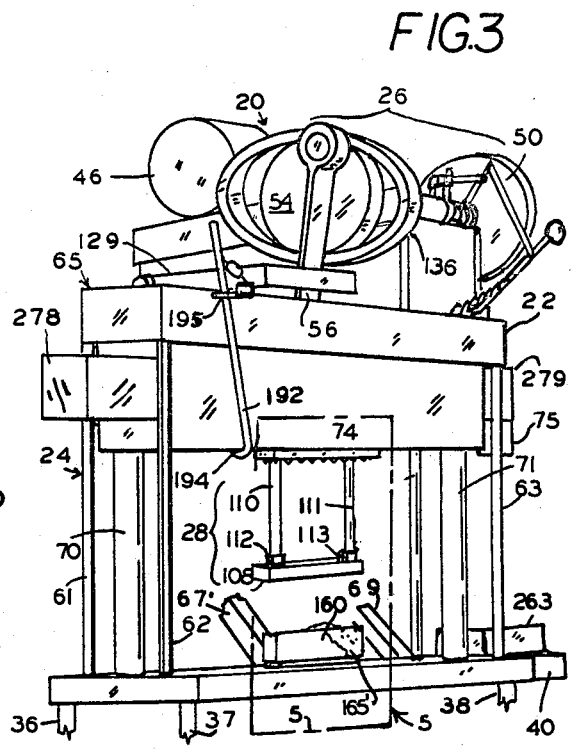
Figure 4:
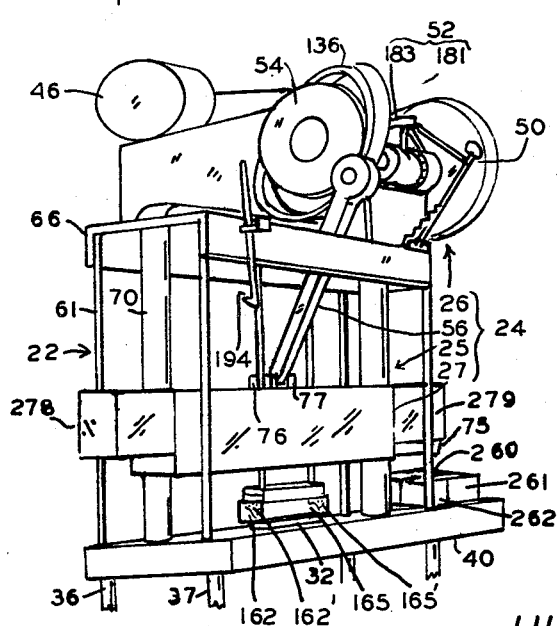
Figure 5:
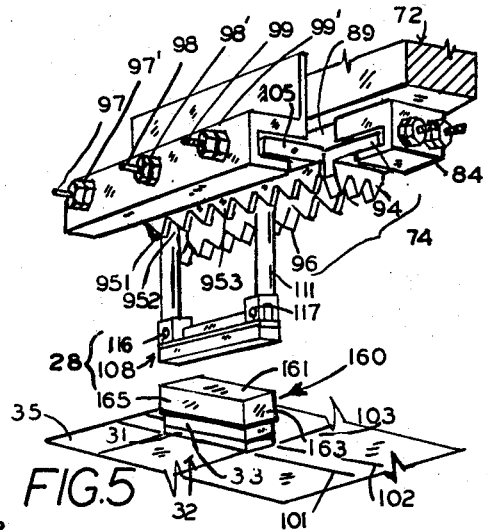

Other objects of this invention will be apparent to those skilled in the art from a study of the below specification and the hereto attached drawings referring thereto and forming a part of the disclosure thereof and in which drawings the same number refers to the same element or assembly throughout and wherein;

FIGURE 1 is a top plan view of the apparatus, 20, of this invention shown in FIGURE 2; FIGURE 2 is a side elevational view of a mechanically actuated brick cleaning apparatus, 20, according to the present invention with striker and brick holder assemblies thereof in their elevated position as also shown in FIGURE 3; FIGURE 3 is a side and end oblique perspective view of the apparatus 20 as seen in the general direction of arrow 3 of FIGURES 1 and 2 the apparatus being shown with the brick holder and striker assemblies in their raised positions; FIGURE 4 is a side and end oblique view of the apparatus 20 wherein brick striker assembly 24 and brick holder assembly 28 are in a position lower than in FIGURE 3, but the striker body is in a higher position than in FIGURE 6; FIGURE 5 is an enlarged oblique wide angle perspective view of zone 5 of FIGURE 3 to show details of the brick holder subassembly, the brick striker teeth, the anvil and a brick on said anvil in the stage of operation shown in FIGURE 3; FIGURE 6 is longitudinal cross sectional view of the apparatus of FIGURES 1–5 along the flat vertical plane shown as 6—6 in FIGURE 2 with the striker assembly 24 and brick holder assembly 28 in their lowermost position with a brick which had been held and cleaned; FIGURE 7 is an enlarged top oblique perspective view of the pivotal frame 129 of the brick holder assembly (shown also in FIGURE 1).

FIGURES 8 through 15 are diagrammatic representations of the sequence of relations of the finger assembly and striker assembly and associated cam movements during the operation of the apparatus 20, taken along vertical transverse section 8–15 of FIG. 6.

FIGURES 16, 17 and 18 are diagrammatic views, partly longitudinal cross sectional views as in FIGURE 6, and partly side views, of a pneumatically controlled and driven apparatus 220 according to this invention in the raised, intermediate and lowered position of the striking and holding assemblies thereof and, FIGURE 19 is an oblique fragmentary perspective view of feeding and discharge conveyors to and the anvil subassembly for apparatuses 20 and 220.

A preferred embodiment of apparatus, 20, according to this invention comprises an anvil frame and support assembly 22, a striker assembly 24, and a brick holder assembly 28. The striker assembly 24 is firmly affixed to and supported on the anvil frame and support subassembly 22 in part and, in part, movably supported thereon.

The anvil frame and support assembly 22 comprises a heavy steel anvil 32 and an anvil table 34. Table 34 is sturdy, rigid, heavy steel table which comprises a flat, level table top 35 of solid sturdy steel plate, and said top is firmly attached to and is supported at a height convenient for manipulation of material thereon on legs 36, 37, 38 and 39. The anvil 32 comprises a flat, thick (⅝ inch in preferred embodiment) level, heavy, rectangular steel plate 31 and a flat rectangular hard rubber sheet 33. Plate 31 and sheet 33 both have the same rectangular size and shape. This rectangular size corresponds to within ⅛ of an inch (i.e. up to ⅟₁₆ less than the size of the brick face on each side) of the size of the clear face of the brick to be cleaned. Plate 31 is firmly attached to the center of top 35. It may be replaced by other plates after wear and also to permit different size anvils to be used with different sizes of bricks. Sheet 33 is imperforate and smooth surfaced.

Also, the rubber sheet 33 is, in the preferred embodiment, ⅛ of an inch thick. Sheet 33 is firmly attached to the upper face of the plate and reduces shock on the brick face adjacent to the anvil top during the operation of the apparatus as below described. The surface 35 is scored as shown by score lines 100, 101, 102, and 103 to facilitate the proper location of the brick 160 on the top of the anvil 32 notwithstanding that the brick may have a thickness of mortar on any or all of its vertical faces up to ½ of an inch thick, brick 160 being the brick to be cleaned.

Striker assembly 24 comprises a striker guide and drive support subassembly 25, a striker drive subassembly 26 and a striker unit 27. The striker drive subassembly 26 is supported on the striker guide and drive support subassembly 25. The striker unit 27 is moved and supported by the drive subassembly 26 and guided in its motions by parts of the subassembly 25.

The striker guide and drive support subassembly 25 comprises four vertical support legs 61, 62, 63 and 64 which are firmly attached to the bottom of and support a front portion 65 of an L-shaped rigid steel striker drive subassembly support frame 66. The subassembly 25 is firmly affixed to and supported on the table 34. The rear portion 67 of frame 66 is supported on columns 67', 68 and 69 which are supported on the table 34 and firmly attached thereto.

The support subassembly 25 also comprises rigid vertical striker alignment columns 70 and 71 which are rigidly and firmly attached to the table top 35 at the bottom of each such column and, at the top of each such column, rigidly and firmly attached to the frame 66, portion 65.

The striker drive subassembly 26 comprises, in operative combination, a striker motor 46, a pulley wheel 18, a geared drive wheel 50, a clutch subassembly 52, eccentrically mounted crank wheel 54 and a connecting arm 56. An eye at one end of the connecting arm 56 is attached to a pin in the striker unit 27 as below described.

The striker drive motor 46, 2 horsepower in the preferred embodiment, is a conventional 110 volt A.C. motor with a drive pulley 45 and is firmly mounted on portion 67 of frame 66. Spaced away from pulley 45 and in line therewith is a driven pulley 48 rotatably supported on the frame 67. A conventional pulley belt 47 operatively connects the pulley 45 and the pulley 48. The shaft 44 of the pulley 48 is rotatably supported on frame 66 and is firmly affixed to pulley 48 and also to a smaller diameter spur gear 49. The teeth of spur gear 49 engage and drive the outer gear teeth of a gear wheel 50. The gear wheel 50 is rotatably attached to the frame 66 by bearing supports 51 and 41 for shafts 55 and 58 respectively.

The gear wheel 50 is firmly connected to a splined drive shaft 55 which is rotatably supported on frame 66 by support 51. A driven shaft 58 is firmly connected to a rigid sturdy eccentrically mounted crank wheel 54 and rotatably supported on frame 66 by support 41. A clutch 52 releaseably and controllably connects shaft 55 to shaft 58.

A stub shaft 59 is firmly attached to and extends from the rigid eccentrically mounted crank wheel 54. A collar 57 at the upper end of connecting arm 56 is pivotally attached to the stub shaft 59. An eye 79 at the other end of the arm 56 is pivotally attached to the striker unit 27 through a pin 78.

The clutch subassembly 52 is a standard simple jaw clutch such as diagrammatically shown as Item E, page 247, Engineers' Illustrated Thesaurus by Herkimer, Chemical Publishing Company, 1952 or Figure 18, pages 24–51 of Kent's Mechanical Engineers' Hand-book, Shop Practice, 11 Edition, 1938. Square jaw teeth rather than spiral jaw teeth are used so that the motion of the shaft 55 may drive in both directions for backing off the finger plate as desired. In the particular embodiment 20 a clutch handle 181, held in the open or in the closed position by a snap over spring, actuates a bell crank 183. The bell crank 183 moves a fork 185 along the length of the shaft 58. The fork actuates and moves the movable jaw of the clutch. The movable clutch slides on the feathered shaft 58. The jaw 187 thereby moves into and out of contact with the fixed jaw 189 which is fixed to the drive shaft 55 and thereby the wheel 50. Thereby the crank wheel 54 and the gear wheel 50 are connected one to the other firmly by the engagement of the clutch jaws. This engagement may be released as desired by the operator. The engagement is sufficiently readily controlled so that the operator may always stop connection of the wheel 50 and 54 with the body 72 in its uppermost position as shown in FIGURES 2 and 3. When the apparatus is in this position the operator may readily adjust brick 160 on the anvil 32 without fear of bodily harm. By use of the clutch the operator may then drive the body 72, move downward the full length of the height of the column 70 and 71 prior to striking the brick with the subassembly 74.

A safety latch arm subassembly 190 is also attached to the frame 66. It comprises an arm member 192 with a hook 194 at its lower end. This hook engages the bottom of the body 72 and prevents its coming down unless the operator releases the hooked arm 192 which is normally held in locking position (holding the unit 72) by the spring 196 until released by the operator. Thereafter the body 72 may move downwards, as below described.

The striker unit 27 comprises a striker body 72 and, firmly attached thereto, the striker teeth subassembly 74 and splitter blade 75. The body 72 is a heavy, sturdy, rigid, firm steel body. It is generally rectangular in outline and is provided with vertical parallel passages therethrough for the vertical striker alignment columns 70 and 71 and for the rods 110 and 111 as below described; it is also provided with a chamber 89 for reception of brick 160 and the parts of the holding mechanism 108 therefor in the lower position of the body 72 as shown in FIGURES 6, 19 (and 18).

A pair of upwardly projecting lugs 76 and 77 are firmly attached to the top of the body 72 as shown in FIGURES 6 and 4. A pivot pin 78 passes through and is firmly held by the lugs 76 and 77. The bottom end of the connecting arm 56 of the striker drive subassembly has an eye or passageway 79 by which it is firmly and pivotally attached to the pin 78. Near to both of its ends the body 72 is provided with vertical cylindrical holes 80 and 81 for sliding engagement with the cylindrical striker alignment columns 70 and 71 respectively. Cylindrical holes 80 and 81 smoothly yet slidably fit about the cylindrical columns 70 and 71 respectively and provide a guide for the vertical reciprocatory motion of the striker body 72.

The striker teeth subassembly 74 comprises left and right lateral striker teeth unit support plates 83 and 84 and front and rear end teeth support plates 85 and 86 and associated teeth units. The plates 83–86 each comprise an L-shaped support plate the vertical portion of which (e.g. portion 82 of plate 85) is firmly attached to one face of the body 72 (see FIGURE 10) and extends peripherally of the chamber 89 in the striker body 72. Each of the group of striker teeth 93, 94, 95, and 96 are firmly attached to and supported on adjustable bases 107, 104, 105, and 106, respectively, in an adjustable yet firmly fixed fashion. More particularly, and exemplary of all the teeth of subassembly 74 the front striker teeth 951, 952, and 953 are attached to a base member 105 which is rectangular in vertical section and in horizontal outline and which engages and is attached to plate 85 by adjustment screws 97, 98, and 99; these adjustment screws are each provided with conventional lock nuts 97', 98', and 99', respectively. The screws are threaded and screw into the plate 85 and are positioned by the lock nuts to support the straight-edged member 105 at such distance from the center of chamber 89 as desired. The shock met by the meeting of the teeth as 951, 952, and 953 with the mortar as 165' on the face 165 of brick 160 to be cleaned is passed directly to the plate 82 of the support plate 85 and from there to the body 72 of the striker unit 27. Similar adjustment of teeth subassemblies 94, 93, and 96 spaces all the teeth as desired from the center of the hole 89 in the body 72. All of the teeth groups are formed of hardened manganese steel such as is conventionally used in rock crushers. Teeth, as 93, are located at the inner edge of the support members as 107 therefor and are firmly attached thereto. This provides for readily adjustable location of the teeth with respect to the brick to be struck as desired. According to this arrangement using standard threads, adjustment of ±1/64 inch are readily achieved between opposing sets of teeth, as 96 and 95, and 94 and 93, across the width and across the length of the chamber 89.

A splitter blade 75 is a vertically and horizontally elongated chisel edged sturdy steel blade; it is firmly held at its top by a bracket 203 and at one side to and laterally of the side of body 72. The lower edge 202 of blade 75 has a chisel edge which extends horizontally to but, in its lowest position, spaced away 1 inch from the top of table 35. A group 263 of several bricks as 260, 261, and 262 joined together by mortar or cement may be conveniently and rapidly separated by striking the group along the line of mortar with the blade 75 by actuating the unit 72 to move downward as below described while the group 263 is supported on the extension 40 of the table 35 lateral of the columns 63 and 64. This serves to separate the individual bricks, with mortar attached to up to four sides thereof, from each other; such bricks are then cleaned as below described for a single brick, as 160.

The safety striker catch 190 comprises a rigid steel arm 192 pivotally supported at pin 197. Pin 197 is firmly fixed to frame 66, the arm 192 has a lower section 193 with a hook 194 thereon that, in the locking position thereof (shown in FIGURES 2, 3, and 4) engages the bottom of striker 72 and supports the striker unit and prevents it from moving downward. A spring 196 attached at one end to a bracket 195 fixed on frame 66 and at the other to the upper portion 191 of arm 192 keeps the safety's to the upper portion 191 of arm 192 keeps the safety hook 194 in locked position until the operator releases it.

The brick holding assembly 28 comprises finger 108, support rods 110 and 111 therefor, pivotal frame 129, and resilient cam 136, and associated springs and sleeves and adjustment nuts.

The finger subassembly 108 comprises a rigid steel finger plate 114 of rectangular shape in plan view. It has slightly less (⅟₁₆ inch less) than the dimensions of the brick to be held thereby. The plate 114 is provided with near its top and near to its right and near to its left ends with pivot pins 117 and 116 for attachment thereof to the support rods therefor. This permits that plates as 114 may be changed to accommodate varying sizes of finger plates for varying sizes of brick to be cleaned. The plate 114 in the preferred embodiment includes a heavy vertically extending supporting rib 118 of substantial thickness with cylindrical hole 226 and slot 227 in which the pins 116 and 117 are pivotally held. A flat, thick (½ inch in the preferred embodiment), firm yet resilient rubber sheet provides a gripping element 119 which is firmly attached to the bottom of plate 114. Element 119 has the same outside dimensions as plate 114 and the edges of element 119 are co-planar with the edges of the plate 114. Element 119, in cooperation with the tiltable plate 114, rods 110, and 111 and other elements of the brick holding assembly 28 holds the brick to be treated firmly enough to prevent sliding of that brick, even when mortar is attached thereto only on one vertical side or on two non-opposed vertical sides or three or four of the sides and whether or not mortar is also on top of the brick and the brick is struck vigorously as below described according to this invention.

The support rods 110 and 111 are each sturdy, rigid, steel, solid cylindrical rods (¾ inch in diameter in the preferred embodiment) that terminate at and are firmly attached at their bottom to a lower yoke 112 and 113 respectively. Each yoke, as 112, rotatably yet firmly engages the adjacent pin as 116. Pin 116 rotates in hole 226; pin 117 slides in slot 227 as needed.

Striker body 72 is provided with vertical cylindrical passageways 120 and 121 for the rods 110 and 111 respectively. Rods 110 and 111 extend through the passageways 120 and 121 freely i.e. with a loose sliding fit, although these passageways hold the rods 110 and 111 in alignment so that they may move up and down relative to anvil 32 while parallel to the columns 70 and 71.

At about its middle, and well above the top of body 72 in the lowered position of that body by a distance of at least the height of the brick on anvil 32 to be struck rod 110 has firmly fixed thereto a collar 310 and rod 111 a similarly located and fixed collar 311, collars 310 and 311 have a diameter twice that of the passageways 120 and 121, respectively.

Above collar 310 and 311 spring tension adjustment nuts 312 and 313, respectively, are located: rods 110 and 111 and their equivalent associated parts (springs, collars and nuts) are all of equal size and spacing. Above nut 312 the top of rod 110 is slidably located within a hollow circular sleeve 320 closed at its top to form a spring chamber therebelow and within and below a helical compressor spring 322 therein; spring 332 sits on nut 312 (see FIGURES 8–15). Rod 110 moves upward and downward within sleeve 320. Above nut 313 the top of rod 111 is similarly slidably located in a similar sleeve 321 closed at its top to form a spring chamber therebelow and within and below a compression spring 323 therein; spring 323 sits on nut 313. The tops of sleeves 320 and 322 are firmly attached to the members 142 and 140 respectively. Yokes 112 and 113 hold pins 116 and 117 firmly for pivotal movement of rib 118 about either of such pins. However, the hole 226 is sufficiently deep (through member 118) and makes a sufficiently close sliding fit on pin 116, and although the length of slot 227 extends parallel to the length of rib 118 it also sufficiently closes yet slidably fits pin 217 to prevent any substantial rotation of pin 116 or 117 about an axis extending from rod 110 to rod 111 and parallel to table 35.

This structural arrangement permits pivotal motion of plate 114 about the axis of pin 116 or about axis of pin 117 while keeping the central longitudinal plane of plate 114 and rib 118 in the vertical plane common to the longitudinal axes of rods 110 and 111.

The space between the top, 314, of rod 110 (see FIGURES 12 and 6) and the top of the chamber in sleeve 320 and between the top, 315, of rod 111 and the top of chamber within sleeve 321 and the resilient action of springs 322 and 323 allows plate 114 to tilt about an axis perpendicular to the length of rod 110 or 111 even in the position of cam 136 and plate 114 shown in FIGURES 9–13. This structure thus permits plate 114 such pivotal action as is needed to accommodate for any irregularities on the top face, 161, of a brick 160 to be cleaned by apparatus 20 while even then firmly holding such brick in the sequence of steps below described for FIGURES 8–15. This upper structure of rods 110 and 111 provides for a firm holding of the brick, as 160, to be cleaned to the anvil 32 notwithstanding any droppings of mortar that may be adherent on the upper face, 161, of the brick 160. Face 161 is opposed to the smooth lower face, 166, which face is supported on the upper surface of the anvil 32. The rods 110 and 111, the passageways 121 and 122 and the columns 70 and 71 of apparatus 20 (and 220) all have their vertical axes lying in the one flat vertical plane which bisects the plate 31 of the anvil subassembly 32 and is located symmetrically between the rods 61 and 63 on one side and 62 and 64 on the other; striker body 72 is symmetrical across such plane; the brick holder subassembly 28 below frame 129 is also symmetrical across that plane.

The pivotal frame 129 comprises a rigid, sturdy handle portion 132 and a rigid, sturdy, hollow, boxlike frame portion 134. The handle portion 132 is pivotally attached at its left end (as shown in FIGURE 6) to a pivot pin 130, which is attached to a lug 131 which is firmly affixed to the portion 65 of frame 66. At its other, right, end the handle 132 is firmly affixed to the frame portion 134. The ment 140 and parallel thereto, left hand transverse element 142, a front longitudinal element 144 and, parallel thereto, rear longitudinal element 146, all joined together to form a rigid, rectangular boxlike structure. A space 148 is encompassed within the frame member 134. A rigid steel (⅜ inch thick) plate member 150 is firmly attached as by welding to the arm 132 and the member 142 and a 2 inch wide ⅜ inch thick plate member 151 is firmly attached to the arm 140. The centers of the plate portions 150 and 151 lie in and are in the vertical plane which passes through the center of pin 130 and the axes of members 110 and 111 lie in the same vertical plane. The space 148 is located so that the arm 56 may oscillate and reciprocate therein for connection of the stub shaft 59 of the eccentric wheel 54 and the lugs 76 and 77 of the striker body 72. A spring like elliptical and resilient cam 136 is firmly attached to the eccentric wheel 54; it contacts the arm 140 and, during the rotation of the eccentrically mounted crank wheel 54 it drives the arm 140 and concurrently the arm 142, downward. Rod 110 slidably fits in spring 310 and in sleeve 320 below 150 and rod 111 similarly fits below the plate 151 in 321 and in 323. The rods 110 and 111 pass freely through hole 156 in frame 66. Hole 156 is below space 148. Holes 120 and 121 serve to align the brick holder plate 114 relative to the anvil 32 inasmuch as the holes or passages 80 and 81 maintain the alignment of that body with the columns 70 and 71 and the anvil 32. The rotation of the crank wheel 54 drive the eccentric resilient cam 136 affixed thereto. A bearing 141 is rotatably mounted in the center of and projects upward of transverse element 140: this bearing is contacted by cam 136. The motion of cam 136 and of body 72 provides a 2 to 3 inch vertical travel of the finger plate 114 in each cycle of operation (see FIGURES 8–15) while the striking teeth subassembly 74 moves vertically about 11 inches in the same cycle. The top of body 72 contacts the collars 310 and 312 to raise rods 110 and 111 and finger subassembly 108 from the cleaned brick; the movement of the body 72 permits the cam 136 to urge the finger assembly into forceful yet resilient holding contact with the to-be-cleaned block prior to the striking of the mortar on that block by the striker teeth subassembly 74.

In the preferred embodiment of this invention the plate 31 is ⅝ inch thick and sheet 33 is ⅛ inch thick. This permits that the teeth as 93, 94, 95, and 96, may, after completely cleaning off the mortar from a face of the brick, have ¾ inch of travel before, if the travel were continued, striking the table top 35. Snubber rings 155 and 156 made of heavy rubber and ¾ inch thick are provided at the lower end of the columns 70 and 71. These provide for a snubbing of the action of the striker drive subassembly and the teeth thereof to avoid damage to the table and the teeth. The dimensions of a preferred embodiment of this invention described in the above description are given in Table I herebelow. The frequency of operation of the machine is directed in this particular embodiment to give a maximum striking velocity to the body 72 and its subassembly 74 so as to provide a sufficient momentum to achieve the result of snapping off the mortar. It is of course within the scope of the invention that somewhat more slower moving bodies of greater weight or faster moving bodies of lesser weight and of a stroke may be used. The anvil thickness or depth is adjustable commensurate with the length of the face of the brick to be cleaned so that the movement of the teeth past all of the face of the brick to be cleaned will permit a full travel of the cleaning teeth past all of the face of the brick; at the same time sufficient raising of the anvil face from the anvil table is provided so that the snubbing elements may prevent damage to the table and the striking teeth on repeated operations thereof.

Mortar adheres to one or the other of the two brick faces which it had previously joined, and used bricks usually have one face that is clean. In the brick 160 shown in the figures, the former front or outside face 166 would be a clean face. The amount of mortar attached to the sides as 162–165 will vary from nothing up to ½ inch. Usually there is a thickness of ½ inch or of very little mortar on each of the brick faces to be cleaned. The used brick 160 with adherent mortar as 165′ and 162′ to be cleaned is placed by the operator on and firmly held to the anvil 32 with finger 114 raised about 3 inches over the brick top with the scoring lines used to orient the brick so that the front, clean, face, as 166, thereof lies directly on the anvil. The motor 46 is started or may be running. Safety striker catch 190 is released and the clutch 52 connected; the finger 114 which has been in the raised position as shown in FIGURE 2 is then lowered to the position shown in FIGURES 4 and 9. The brick is first contacted (FIGS. 10, 11) by the soft rubber plate 119 below the plate 114 and increasingly firmly held thereby while continued rotation of the drive wheel and the crank wheel 54 moves the striker body 72 downward. While the brick is thus firmly held by finger 114 to the striker teeth engage those portions of the mortar adherent to the sides of the brick which are uppermost and, inasmuch as the force applied to the teeth is about 40 tons, the impact, after a very brief crumbling of mortar to provide for a seating of the teeth and which allows the force of the teeth to be applied to the mortar relatively evenly throughout the mass thereof, removes the adherent mortar in very large pieces, usually two or four large pieces taking care of all the mortar adhering to any one face of the brick. Two opposing sides and two opposing to-be-cleaned brick ends may thus be concurrently cleaned and are if there is any mortar to be cleaned therefrom. The motion of striking of the mortar by the striker is so forceful as to snap off mortar from the brick after the striker teeth seat on the mortor. Some small burrs may remain; the remaining burrs are removed by the continued downward travel of the teeth which are adjusted, as above described through the screws 97, 98 and 99 and associated nuts on bases such as 104, 105, 106 or 107 to adequately approximate the surface of the brick to be cleaned; clean used brick faces thus result.

The continued downward movement of the teeth removes in one pass substantially all of the mortar from up to all four sides of the brick and leaves, in one pass, a brick four adjoining sides (162–5) of which are clean as well as leaving the fifth, originally clean (166) face, also clean. The mortar or cement adherent to the top face (161) of the brick which is cleaned are usually "droppings" and are not particularly adherent to the brick so that merely lightly striking that face of the brick as by hand removes such encrustation from the brick and allows that brick to be readily stacked. Usually one brick may be handled easily every two seconds by apparatus 20 once a group thereof have been piled adjacent to the cleaning machine 20. Mere scraping of the adherent mortar using only 5,000 pounds force between striker and mortar does not remove the mortar cleanly; a substantially larger, approximately 40 ton force as provided by apparatus 20 cleanly separates the mortar from the face of the used brick. The support provided for the brick to be cleaned by the holding or finger subassembly 108 and anvil is such that a rapid and forceful shearing stress is applied to the mortar as 162′, 163′, 164′ and 165′ adherent to each of the four sides 162, 163, 164 and 165 respectively of the brick 160 to be cleaned and no force is directly applied to the body of the brick by the teeth as the impact of the striker teeth is applied directly only to the mortar. There is no skewing of the brick when the mortar is struck by the teeth 93–96 because the brick is firmly held by finger plate element 119 and anvil 32 prior to the initial striking action of the striker teeth on the mortar and the line of motion of the teeth is parallel to the sides of the brick, as shown in FIGURES 9–12.

After one brick as 160 has been cleaned of adherent mortar as 162′, 163′, 164′ and 165′ on faces 162, 163, 164 and 165 respectively, as above described, the finger plate and striker body 72 are raised to their uppermost positions. The striker body 72 is moved upward, urged by stub shaft 59 and arm 56, as in the movement shown from position of FIGURE 12 to that in FIGURE 13 and 14. In the position of FIG. 15 the top of body 72 engages collars 310 and 311 and moves the rods 110 and 111 and plate 114 upwardly after the bottom of the teeth subassemblies 93, 94, 95 and 96 are above the top of the brick 160. Thereafter (at uppermost position of body 72) the striker safety catch 190 automatically latches onto the striker, the operator manually disengages clutch assembly 52 to release the driven eccentric wheel 54 from connection with drive wheel 50, then removes the cleaned brick from the anvil 32 and places another used brick on the anvil, its clean face (corresponding to 166) down on the flat upper face of the anvil 32 (the upper anvil face being cleaned as necessary to keep it clean and flat) releases catch 190, connects clutch 52 and cleans the second used brick.

Generally, the apparatus 20 and 220 utilize the fact that used bricks to be cleaned, as 160, have one face thereon, 166, that is clean in the front and provides a solid flat base for location thereof on the anvil 32. It is this face of which the dimensions are utilized to locate the striker teeth by adjustment screws 97, 98 and 99 and choose an appropriate size of anvil and brick holding subassembly 114 and 119. Frequently the face 161 opposite the smooth face 166 has mortar attached thereto. If it (161) has adherent and protruding mortar the finger element 114 is resiliently mounted as above described (springs and sleeves above rods 110 and 111) to tilt by rotating slightly about the axis of pin 116 or 117 and so compensate for such irregularities if the resilient distortion of the gripping element 119 does not absorb such irregularities. The gripping element is made of tire tread stock type rubber. The finger subassembly 108 thereby firmly holds used bricks even with accumulations (as 161') on the face opposite to the clean face (166) of a used brick. Accordingly, apparatus 20 reliably operates on used brick because it operates to hold the used brick firmly and strikes the adherent mortar in a consistent manner even though the amount of mortar on the faces of the used brick adjacent the clean face varies as there is not necessarily always the same amount or the same consistency of adherent cement or mortar on all faces of the brick to be cleaned or even on any one face.

According to the process and apparatus of this invention provision is made for the brick 160 to be held stationary on the anvil 31 by the holding subassembly 108 resiliently, so that no damage will be done to the body of the brick, yet firmly, by providing sufficient force of the spring 136 and of the element 119 to avoid slippage thereof. The striking of the mortar on the brick by the striker teeth is so rapid as to snap off the mortar wherever the striker teeth contact it. For this purpose the dimensions of the eccentric 54 provides a rapid and forceful travel of the teeth past the face of the brick to be cleaned. The support provided to the brick to be cleaned by the holding and anvil subassemblies provide that the shearing stress applied by the teeth is applied to the mortar parallel to each of the four sides (or two ends and two sides) of the brick that are to be cleaned, with no stress at all provided by the teeth to the body of the brick being treated (as the stress applied by the teeth is applied only to the mortar). The apparatus is also readily adjustable to different size bricks and blocks and, by firmly holding the brick, avoids that there be any skewing and provides that the striking of the mortar on the brick is sufficiently rapid to create a buckling and a snapping off of the mortar rather than a gradual crushing or scraping action. This very rapid snapping action provides for a clean brick face even though the teeth of the striker do not directly contact all of the mortar on the downward movement of the striker. The momentum and the snapping off action are adequate and reliable; up to all four dirty sides of the brick are concurrently, and without damage to the brick, cleaned in one downward movement of the body 72.

FIGURES 8 through 15 show details of structure and of the sequence of operation of the apparatus 20 whereby the finger plate 114 is brought into contact with and firmly holds the brick 160 to be cleaned prior to the time that any of the teeth subassemblies 93, 94, 95 and 96 contact the brick. In FIGURES 8-15, wheel 54 which is circular and cam 136 which is elliptical in outline are drawn to scale; the other portions of these figures are also to scale. The wheel 54 rotates about an axis 154 which is also the axis or center of cylindrical driven shaft 58. This axis of rotation 154 is shown at the same level in FIGURES 8-11 and in FIGURES 12-15 to show the movement of elements relative to that axis. The center of stub shaft 59 is located at the periphery of the wheel 54. The cam 136 is a heavy C-shaped steel spring elliptical in peripheral outline; more particularly, the outline of cam 36 has the shape of a 45 degree ellipse i.e. the projection of a circle on a flat plane at 45 degrees to the plane of that circle. The cam 136 is joined to the wheel 54 at axis 159, and at the ends of the ellipse, 179 and 180. The conjugate axis, 170, of the ellipse, which ellipse forms the perimeter of the resilient cam 136 coincides with the crank wheel axis 171, a straight line extending from the center of the longitudinal central axis 154 of cylindrical shaft 58 (in the plane of the left side of wheel 54 as shown in FIGURE 6) to the center of the longitudinal central axis 159 of cylindrical stub shaft 59. The length of the transverse axis, 172, of the ellipse i.e. the distance between the points of intersection of the ellipse and its transverse axis, is perpendicular to axis 170 and is slightly greater than the diameter of the wheel 54 which is circular in outline. More particularly, the size of this 45 degree ellipse relative to wheel 54 is related to the function of the ellipse to actuate finger assembly 108; the direction of a straight line drawn from the axis 154 of length the same as distance from 154 to 159 (distance 174 in FIGURE 8) at the point of maximum angular displacement therefrom while still terminating on the outline of the ellipse which forms the outline of cam 136 (shown as angular relationship, 177, of 45 degrees with conjugate axis 170 in FIGURE 11) is, at the position of the crank wheel 54 at which the subassembly 74 initially contacts the top of the mortar on the face of the brick 160 to be struck, i.e. when the bottom of subassembly 74 is at the level of the top of faces 162, 163, 164 and 165 of brick 160, vertical.

FIGURE 8 shows the relationships of the stub shaft 59 and the frame element 140 and a ball bearing 141 which is supported on and attached to the frame member 140 and contacted by either the lower edge of the wheel 54 or cam 136. FIGURE 8 also shows the spring 322 therebelow and also the frame 66 on which the frame 129 is pivotally attached. As diagrammatically shown in FIGURES 8-15, especially in conjunction with the showing of FIGURES 6 and 7, either the lower edge of eccentric wheel 54 or the lower edge of elliptical spring cam 136 contacts (through a well greased surface and/or the bearing 141) and drives the frame 134 down. The rods 110 and 111 are attached by sleeves and springs therein to frame 134 and are driven down therewith as above described and in turn the finger plate 114 is firmly yet resiliently driven down, to contact and hold a brick as 160 (FIGURES 10, 11, 12 and 13). Springs 320 and 321 urge frame 134 upward as permitted by the position of cam 136 and wheel 54 and body 72.

FIGURES 8 through 15 are taken at 45 degree intervals during a clockwise rotation of the crank wheel axis (171) which is coincident with the conjugate axis 170 of the ellipse forming the peripheral outline of cam 136. As shown at FIGURE 8, in its uppermost position the finger plate 114 is spaced away a slight distance, about 3 inches, above the brick 160. The amount of the vertical displacement (shown by 205) from the original height 206 of the member 142 of frame 129 and finger shown in FIGURE 8 is rather slight during the first 45 degrees of angular motion of wheel 54 and also the vertical displacemnt 207 of the stub shaft 59 is likewise relatively small. However, as shown in FIGURE 10, inasmuch as the finger plate 114 has, in the operation of apparatus 20, a total absolute distance of movement that is substantially less than the amount of movement of stub shaft 59, a firm locking of the finger plate 114 and element 119 on the to-be-cleaned brick 160 is made when the distance of the conjugate axis 170 from the top of wheel 141 is the same as the distance between the axis 159 of shaft 59 and the axis 154 of shaft 58, well prior to the first contact of teeth assembly 74 and the top face 161 of the to-be-cleaned brick 160.

In the preferred embodiment the transverse axis 172 is perpendicular to a straight line from the axis 154 to axis 159 and the elliptical outline of cam 136 intersects its conjugate axis at the axis 159 of shaft 59 at the outer or radial end of the crank wheel 54. In apparatus 20 the length of ½ of the conjugate axis is less than the geometrical radius of the circular outline of the circular crank wheel 54.

In operation the eccentric stub shaft 59 operates at a normal speed of 44 cycles per minute. The body 72 undergoes a total stroke of 11 inches. The finger plate 114 has a stroke however of about only 3 inches. The body 72 exerts a static force of 40 tons on the mortar adherent to the perimeter of a conventional brick 8½ inches long and 3½ inches wide and 2¼ inches high i.e. a perimeter of about 24 inches. The force of finger plate 114 on face 161 is about 500 lbs.

Apparatus 220 is composed of an anvil frame and support subassembly 222, a striker assembly 224 and a brick holder assembly 228. The striker assembly 224 is firmly affixed to and supported on the anvil frame and support subassembly 222.

The anvil frame and support subassembly 222 is identical to the assembly 22 of apparatus 20 and the same reference numbers are used therefor. The striker assembly 224 comprises a striker guide and drive support subassembly 225, a striker drive subassembly 326 and a striker unit 327. The striker drive subassembly 326 is supported on the striker guide and drive support subassembly 225. The striker unit 327 is moved and supported by the drive assembly 326 and guided in its motions by parts of the subassembly 225.

The striker guide and drive support subassembly 225 comprises vertical guide and support colums 61, 62, 63, and 64 with a frame 366 thereabove fixed thereto. Frame 66 supports the subassembly 326 and is fixedly attached thereto.

The striker drive subassembly 326 comprises, in operative combination as shown in FIGURES 16, 17 and 18, a valve 230, a piston chamber 232, a piston 234, a drive shaft 236, an input line 238 operatively connected to a source of compressed air (compressor 235) an exhaust line 240, an auxiliary upper cylinder input line 239 and auxiliary lower cylinder connecting line 237. The drive shaft 236 is attached to a pin in the striker unit 327.

The striker unit 327 comprises striker body 272 a rigid steel frame with vertical holes 381–384 for columns 61–64 respectively and a chamber as 89 therein for the brick to be cleaned as 160 and, firmly attached to the body 272 a striker teeth subassembly 274 similar to subassembly 74 above described for the body 72.

In this apparatus 220 the brick holder assembly 228 comprises a finger 414 supported on rods 410 and 411, adjustment nuts 412 and 422 on rod 410 and nuts 413 and 415 on rod 411 provide for the adjustment of tension in springs 417 and 418 respectively on rods 411 and 410. Upward motion of the body 72 caused by positioning of the valves 230 as shown in FIGURE 18 drives the piston 234 upward to the position shown in FIGURE 16; at the position shown in FIGURE 16 the top of the body 72 engages the nuts 412 and 413 and moves the finger 414 upward. Adjustment of the valve 230 to the position shown in FIGURES 16 and 17 drives the body 72 downward as shown in FIGURE 17. However, the springs 418 and 417 seated against frame 66 move the finger 414 downward ahead of the motion of the body 72 in the apparatus 220 whereby the force of the springs 418 and 417 is exerted against the finger 414 (similar in structure to finger element 114 above described) and holds a brick 360 against the anvil 32 as above described for the apparatus 20 prior to the striking of the brick by the teeth subassembly 274 supported in the body 272. This embodiment 220 is a separate apparatus to effect the phase and time relationships as above described for the apparatus 20 by a pneumatic means rather htan by the mechanical means hereinabove described. This apparatus 220 serves to strike the adherent mortar on a brick and remove that mortar therefrom in the same general manner as described for the apparatus 20, and the geometric relations of the striking teeth unit are the same as above described for the apparatus 20. However the apparatus 20 provides a more rapid striking cycle than does 220 and so operates more satisfactorily.

In operation a brick 360 is placed on anvil 332 and the valve 230 is positioned as shown in FIGURE 16. This drives the piston 234 and the connecting arm 236 downward. The arm 236 is attached by a pin 257 to lugs therefor on the body 272 and drives the striker teeth downward as above described for the apparatus 20. The finger unit 414 is in advance of the downward motion of the body 272 and contacts the brick 360 prior to the striking of that brick by the teeth 274 of the body 272. Further motion downward of the piston 234, driven by the gas pressure in the line 238 and 239 with valve 230 in its position shown in FIGURE 16 moves the striker unit 272 to the bottom of its travel as shown in FIGURE 18, which corresponds to the bottom of the travel for apparatus 20. The movement of the valve 230 to the position shown in FIGURE 18 by the operator moving valve handle 270 attached to valve body of valve 230 provides for upward motion of the unit 272 to the position shown in FIGURE 16. On the way upward the body 272 engages and moves upward the nuts 412 and 413 on rods 410 and 411 and, thereby moves the finger 414 from engagement with the brick 360. This allows the operator to remove the cleaned brick and add to the top of the anvil a new brick to be cleaned.

According to the embodiment of apparatus shown in FIGURE 19 bricks to be cleaned may be brought to the anvil 32 by a conveyor as 280 having upstanding arms which serve to guide one brick at a time to place. This allows one or more operators to orient the bricks to facilitate their rapid placing by another operator at the machine 20 or 220 on anvil 32. Cleaned bricks are removed to conveyor 282.

TABLE I.—DIMENSION OF EMBODIMENT OF FIGURES 1-15

| Item | Description | Dimension | Quantity |
|---|---|---|---|
| 54 | Eccentric wheel | Diameter, inches | 8 |
| CL 58–CL 59 | Distance | Radius of path of shift 59, inches | 5½ |
| 172 | Transverse axis of elliptical cam 136 | Width of ellipse, inches | 12 |
| 170 | Conjugate axis | Height of ellipse, inches | 7 |
| 45 | Drive pulley | O.D., inches | 3 |
| 50 | Gear wheel | O.D., inches | 16 |
|  |  | Teeth | 96 |
| 49 | Spur gear | Teeth | 16 |
| 160 | Brick | Height, inches | 3⅝ |
|  |  | Length, inches | 8¼ |
|  |  | Width, inches | 2½ |
| 32 | Anvil | Height, inches | ⅝ |
|  |  | Length, inches | 8 |
|  |  | Width, inches | 2 |
| 134 | Frame portion | Width, inches | 12 |
|  |  | Length, inches | 4½ |
|  |  | Height, inches | 2 |
| 70, 71 | Alignment | Diameter, inches | 2 |
|  | Columns | Height, inches | 20 |
| 61–4 | Support legs | Diameter, inches | ¾ |
| 61–62 | CL to CL | Distance, inches | 8½ |
| 63–64 | CL to CL | Distance, inches | 28 |
| 110 | Support rod | Diameter, inches | ½ |
| 72 | Striker unit | Weight, lbs | 500 |
|  |  | Width, inches | 5½ |
|  |  | Length, inches | 40 |
|  |  | Height, inches | 7 |

Distance from bottom of finger plate 114 to bottom of collar is 15″.
CL=center line.

In summary, this invention provides a process of cleaning bricks, as 160, of mortar adherent thereto, said bricks each comprising a clean face as 161 and, adjacent thereto other faces 162, 163, 164, and 165 with variable amounts of mortar as 162′, 163′, 164′, and 165′ thereon. The process comprises the steps of first placing the brick to be cleaned with its clean face against the flat anvil face (as the upper face of anvil 32) which face has a width and length slightly less than the said clean face 161; thus the clean face slightly overhangs said anvil face to allow the teeth and/or the displaced mortar to move to the bottom of the anvil or therebelow, then, secondly, gripping and pushing by cam 136 and assembly 28 on the face 161 of the brick opposite to the clean face thereof in a direction towards the clean face 166 in a direction towards the clean face, thereby holding the brick 160 against said anvil face and securing it in position on the anvil face, and then, thirdly, simultaneously striking and removing the mortar adherent to each of the vertical faces as 162, 163, 164, and 165 adjacent to said clean face in a direction perpendicular to said clean face and along lines each adjacent one of those vertical faces and coextensive therewith for the full length of each such face as 162, 163, 164, and 165 and exterior to the perimeter of clean face 166 while continuing to hold brick 160 firmly against anvil 32; the striking is performed with a force sufficiently great to separate said adherent mortar from each of said faces by snapping said mortar from each of said faces in large pieces, rather than by scraping the mortar off. More particularly, the striking is effected with a force of at least 1½ tons per linear inch of perimeter of said clean face to insure a clean snapping off and separation of the mortar from the faces of the brick.

In the preferred embodiment said bricks as 160 are rectangular in plan and in side view, each said brick is held against the anvil face 32 on the face of the brick (161) opposite to the clean face at a plurality of spaced apart points by the finger plate 114 over an area substantially the same size as said anvil and said clean face. Rods 110 and 111, which urge the end of plate 114 downwards are each separately urged downward by their spring and sleeve assemblies as 320 and 322 for rod 110 and 321 and 323 for rod 111.

FIGURE 10 shows the group of teeth 93 and 94 and their support plates 83 and 84 on body 72 diagrammatically: the teeth are shown only symbolically in FIGURES 8, 9 and 11–15.

Replaceable sleeves 420 and 421 are provided in body 72 as shown in FIGURE 6. These sleeves are firmly fixed to the body 72. The interior of those sleeves provide passageways 120 and 121 respectively for vertical reciprocatory movement of the rods 110 and 111 therein.

The maximum width of the cam 136 may vary from 10 inches if the cam is rigid to 12 inches if the cam is flexible. In the preferred embodiment the cam 136 is formed of flexible material and is 12 inches wide at its maixmum width. The elliptical cam is joined at its center to the outer edge of the stub shaft 59 at its (the ellipse's) conjugate axis. However, for purposes of clarity of representation cam 136 is shown in FIGURES 8–15 as 10 inches wide and rigid in order to show the relationships of the moving elliptical outline of cam 136, eccentric wheel 54 and the sleeves and collars for the rod 110 because, in the case of a flexible elliptical cam joined to the outer edge of the shaft 59, as is used in the preferred embodiment, the skewing of the 12 inch wide resilient, elliptical cam (made of ¼ inch thick and 1 inch wide springs) obscures the phase relationships shown in FIGURES 8–15 for a less resilient but smaller cam. It is within the scope of this invention that a more resilient, larger cam as in Table I and FIGURES 2–4 as well as the less resilient, smaller cam of FIGURES 8–15 which provides the same phase relationships as above described may be used, more particularly, the phase relationships above brought out that the elliptical cam causes the finger 114 to firmly grasp the brick 160 well prior to the time at which the teeth 93, 94, 95 and 96 contacts the top of the brick, as is shown in FIGURES 8–15.

The height of the rods 110 and 111 is the same in the position therefor shown in the FIGURES 10, 11, 12, 13 and 14. The distance between the bottom of member 142 and the top of support rod 110 allows for resilient adjustment of the rod 110 for irregularities on the top of the brick 160 due to accumulations or droppings of mortar on the surface 161. A similar space in the similar sleeve and spring structure at the top of rod 111 allows a similar accommodation at the top of rod 111. As rods 110 and 111 are independently urged downward against plate 114, as shown in FIGURE 6, plate 114 may pivot about pins 116 or 117 to form a firm two-point grip with top of brick 160 even though that top surface of that brick be of irregular height or shape.

While the above description is for an apparatus 20 and 220 that treat common red-faced brick, usually of about 3,000 pounds per cubic inch strength and of dimensions as given in Table I, the apparatus 20 and 220 may also be used for tile e.g. 5″ x 10″ x 10″ tiles, when a correspondingly shaped anvil, and correspondingly shaped chamber in the striker body is used to accommodate such a tile. Also, for usual cinder blocks 16″ x 8″ x 8″ a differently sized anvil and a differently sized striker body with a chamber to accommodate such a block is used in place of that of described for the common red-faced brick.

Buckets 278 and 279 may be added to the sides 276 and 277 of the body 72. Each bucket may accommodate a cubic foot of lead (weighing about 800 pounds per cubic foot) to increase the total weight of the body 72 with its bucket to about 1,600 pounds and so increase its impact effect if desired.

Although, in accordance with the provision of the patent statutes, particular preferred embodiments of this invention have been described and the principles of the invention have been described in the best mode in which it is now contemplated applying such principles, it will be understood that the operations, constructions and compositions shown and described are merely illustrative and that my invention is not limited thereto and, accordingly, alterations and modifications which readily suggest themselves to persons skilled in the art without departing from the true spirit of the disclosure hereinabove are intended to be included in the scope of the annexed claims.

I claim:

1. Apparatus for cleaning mortar from bricks comprising, in operative combination, an anvil frame and support assembly, a striker guide and drive and support assembly and a brick holder assembly;
   (a) said anvil frame and support assembly comprising a table surface and support therefor and connected thereto and, firmly attached to said table surface, an anvil presenting a flat surface of rectangular outline extending upward of said table surface;
   (b) said striker guide and drive and support assembly comprising a striker drive support frame, a striker drive unit, and a striker subassembly,
      (i) said striker drive support frame being firmly attached to and supported on and above said anvil frame and support assembly and comprising striker alignment means firmly attached to said striker drive support frame and to said anvil table surface;
      (ii) said striker subassembly comprising a heavy metal striking body frame, one pair of parallel, spaced-apart vertically extending alignment holes passing through said body from the top to the bottom thereof and said body being slidably attached to the alignment means on said striker drive support frame; and operatively connected to and movably supported on said striker drive unit; a hollow chamber within said striker body open at the bottom thereof and there bounded by striker teeth at the periphery thereof and larger in size than the flat surface of said anvil and of a horizontal cross section at least as great as the bricks to be cleaned, a vertically extending brick holder passageway for a brick holding means, said holder passageway extending from the top of said body to the top of said chamber, striker teeth holding assemblies fixed to the striker body and striker teeth held thereby and extending below the bottom edge of said chamber, said striker teeth being formed of metal with a greater compressive strength than the mortar, said striker drive means comprising a reciprocating rigid arm member and drive means operatively attached thereto, said striker drive means being supported on said striker drive support frame and said reciprocatable member being operatively connected to said striker subassembly to reciprocate said subassembly in a direction perpendicular to said anvil face, control means connected to said drive means to power or to release said drive means, said drive means providing said striker subassembly with travel from the top of said table surface of said anvil frame and support subassembly to a height greater than the height from the top of said table to the top of a brick on the top of said anvil;

(c) said brick holder assembly comprising,
  (i) a rigid finger means to contact said brick and extending perpendicular to said anvil surface, said finger means passing through the holder passageway in the striker body and forming a sliding fit therewith, a collar between the top end and the bottom end of said finger means firmly attached to said finger means, the distance from the bottom of the finger means to the bottom of the collar being greater than the height of the striker body,
  (ii) spring means at the top of the finger means operatively connected to said finger means and urging the finger means downward,
  (iii) said finger means, at its bottom end, having a maximum movement downward to a height less than the height of the top of a brick to be cleaned on the anvil, said drive means being connected to said striker body, said striker body in its upper position lifting the bottom of the finger means to a height greater than the top of a brick to be cleaned resting on the anvil surface.

2. Apparatus as in claim 1 wherein the finger means comprises a plurality of vertical finger rods and a brick holder of substantially the same length as the anvil and said finger rods each pass through one of a plurality of spaced-apart holder holes in the striker body extending from the top of that body to the chamber in said striker body and wherein one rigid finger rod at its bottom has one end pivotally connected to a brick holder means which is, at its other end, provided with a slot which is pivotally connected to another of said finger rods, each of said finger rods being separately and resiliently connected to an upper reciprocatable terminal therefor.

3. Apparatus as in claim 2 wherein the striker drive unit comprises a rotatable eccentric pivotally attached to the one end of a connecting arm, the other end of said connecting arm being connected to said striker body and wherein an elliptical cam fixed to said eccentric has a conjugate axis coincident with and smaller than the radius of said eccentric and a transverse axis greater than the diameter of circle traveled by said eccentric drives the finger means into holding contact with said brick prior to the striking of said brick by the teeth of said striker subassembly.

4. Apparatus as in claim 2 wherein said driving unit comprises a fluid chamber supported on said striker support frame, said fluid chamber has a piston reciprocatable therein, said piston being connected at one end to said striker body and operatively connected thereto to reciprocate said striker body to and from said anvil, and control means to drive said piston and said striker body to and from said anvil.

References Cited
UNITED STATES PATENTS

| | | | |
|---|---|---|---|
| 1,496,547 | 6/1924 | Kirsch | 125—26 |
| 1,622,869 | 3/1927 | Grant | 125—26 |
| 1,647,991 | 11/1927 | Grant | 125—26 |
| 2,884,921 | 5/1959 | Drake | 125—26 |

HAROLD D. WHITEHEAD, *Primary Examiner.*